United States Patent
Yamashita

(10) Patent No.: US 6,894,939 B2
(45) Date of Patent: May 17, 2005

(54) DATA PROCESSOR, SEMICONDUCTOR MEMORY DEVICE AND CLOCK FREQUENCY DETECTING METHOD

(75) Inventor: Kazuyuki Yamashita, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 10/617,922

(22) Filed: Jul. 11, 2003

(65) Prior Publication Data

US 2004/0032778 A1 Feb. 19, 2004

(30) Foreign Application Priority Data

Jul. 16, 2002 (JP) ........................................ 2002-207174

(51) Int. Cl.[7] .............................................. G11C 7/00
(52) U.S. Cl. ...................................... 365/203; 365/241
(58) Field of Search .................................. 365/203, 241

(56) References Cited

U.S. PATENT DOCUMENTS 5,386,150 A * 1/1995 Yonemoto .................... 327/141
6,580,653 B2 * 6/2003 Yamanaka .................... 365/210
6,717,865 B2 * 4/2004 Laurent .................... 365/189.06

FOREIGN PATENT DOCUMENTS

JP 2002-055130 2/2002

* cited by examiner

*Primary Examiner*—Van Thu Nguyen
(74) *Attorney, Agent, or Firm*—Scully, Scott, Murphy & Presser

(57) ABSTRACT

In a data processor which comprises a semiconductor memory device, a potential on a bit line of the semiconductor memory device is monitored at the end of a precharge, required for the semiconductor memory device, to detect an anomalous frequency of a clock applied from the outside. The anomalous frequency is detected by determining whether or not the potential on the bit line has reached a predetermined potential. When the potential on the bit line has not reached a predetermined potential, the operation of a CPU is reset.

6 Claims, 5 Drawing Sheets

DATA PROCESSOR, SEMICONDUCTOR MEMORY DEVICE AND CLOCK FREQUENCY DETECTING METHOD

BACKGROUND OF THE INVENTION

1. Field of the Invention

The present invention relates to a data processor, and more particularly to a data processor which comprises a semiconductor memory device that requires a precharge when data is read therefrom.

2. Description of the Related Art

A data processor such as a microprocessor operates in synchronization with a clock within a predetermined frequency range, and is therefore prone to malfunctions if the clock greatly deviates in frequency. To address this problem, Japanese Patent Laid-Open No. 55130/2002, for example, discloses a data processor which comprises a frequency determination circuit for determining whether or not the clock falls within a predetermined range of frequency, for resetting the operation of a CPU when the clock deviates in frequency to prevent malfunctions.

The data processor described in Japanese Patent Laid-Open No. 55130/2002 comprises a frequency detector circuit composed of capacitor C and resistor R. Capacitor C repeats charging and discharging at each timing at which an externally applied clock varies in frequency. The frequency detector circuit delivers an error detection signal when the charging or discharging is not completed within one period of the clock (when the clock frequency is high).

In the conventional data processor as described above, since the frequency detector circuit is composed of capacitor C and resistor R, it encounters difficulties in precisely determining whether or not the clock frequency exceeds a predetermined frequency due to a change in detection characteristics caused by a varying power supply voltage and ambient temperature, variations related to the manufacturing, and the like. Another problem implied in the conventional data processor is a change in the detection characteristics of the frequency detector circuit depending on use conditions after shipment.

In addition, the use of capacitor C and resistor R results in a large area required for the layout of the frequency detector circuit, disadvantageously leading to an increased chip area, for example, when the data processor is integrated in one chip.

SUMMARY OF THE INVENTION

It is therefore an object of the present invention to provide a data processor which reduces a change in the performance of detecting an anomalous clock frequency due to a varying power supply voltage and ambient temperature, variations related to the manufacturing, and the like, as well as limiting an increase in the layout area.

To achieve the above object, in the data processor according to the present invention which includes a semiconductor memory device, a potential on a bit line in the semiconductor memory device is monitored at the end of a precharge to determine whether or not the potential on the bit line has reached a predetermined potential. The precharge operation for the bit line is controlled in synchronization with a clock applied from the outside, and a predetermined period is required for pre-charging the bit line to the predetermined potential. Thus, an anomalous frequency is detected for the externally applied clock by determining whether or not the potential on the bit line has reached a predetermined potential.

In the configuration as described above, since an anomalous frequency of the externally applied clock can be detected, for example, only by adding a latch circuit and a simple logic circuit to an existing semiconductor memory device in association with each bit line, an increase in layout area can be limited as compared with a conventional frequency detector circuit composed of a capacitor and a resistor.

Also, since the limit of frequency at which data can be read from the semiconductor memory serves as a reference frequency for determining whether or not the frequency of the clock is anomalous, the clock frequency at which the data processor can operate and the reference frequency change in similar characteristics even with a varying power supply voltage and ambient temperature, variations related to the manufacturing, and the like. Since this eliminates the need for adjusting the characteristics of a circuit for detecting the precharge duration of the semiconductor memory device pursuant to the clock frequency at which the data processor can operate, an increased cost is limited for the data processor.

The above and other objects, features, and advantages of the present invention will become apparent from the following description with reference to the accompanying drawings which illustrate examples of the present invention.

BRIEF DESCRIPTION OF THE INVENTION

DETAILED DESCRIPTION OF THE PREFERRED EMBODIMENT

Generally, a data processor comprises a semiconductor memory device for storing data processed by a CPU, a program which causes the CPU to execute predetermined processing, and the like.

In the semiconductor memory device, upon reading data therefrom, a bit line corresponding to a read address is precharged to accumulate a charge, followed by application of a predetermined voltage to a word line corresponding to the address. In this event, when a memory cell transistor connected to the word line applied with the predetermined voltage (selected) is in ON state, a current flows to a ground potential through the source and drain of the memory cell transistor, and the potential on the bit line is reduced to the ground potential because the precharged charge is discharged. On the other hand, when the memory cell transistor connected to the word line applied with the predetermined voltage (selected) is in OFF state, no current flows between the source and drain of the memory cell transistor, so that the charge precharged on the bit line is held as it is. The potential on the bit line at this time is detected by a sense amplifier to determine whether data read from the memory cell is "1" or "0".

The precharge operation for the bit line is controlled in synchronization with a clock applied from the outside, and a predetermined period is required to precharge the bit line to a predetermined potential (hereinafter called the "precharge potential"). If the precharge duration is shorter than the predetermined period to set the bit line to the precharge potential, no correct data can be read out however long a discharge duration is.

A data processor according to the present invention is designed to detect a precharge duration of a semiconductor memory device, and determines that an externally applied clock presents an anomalous frequency when the precharge duration is short, followed by delivery of an error detection signal.

Figure 1:
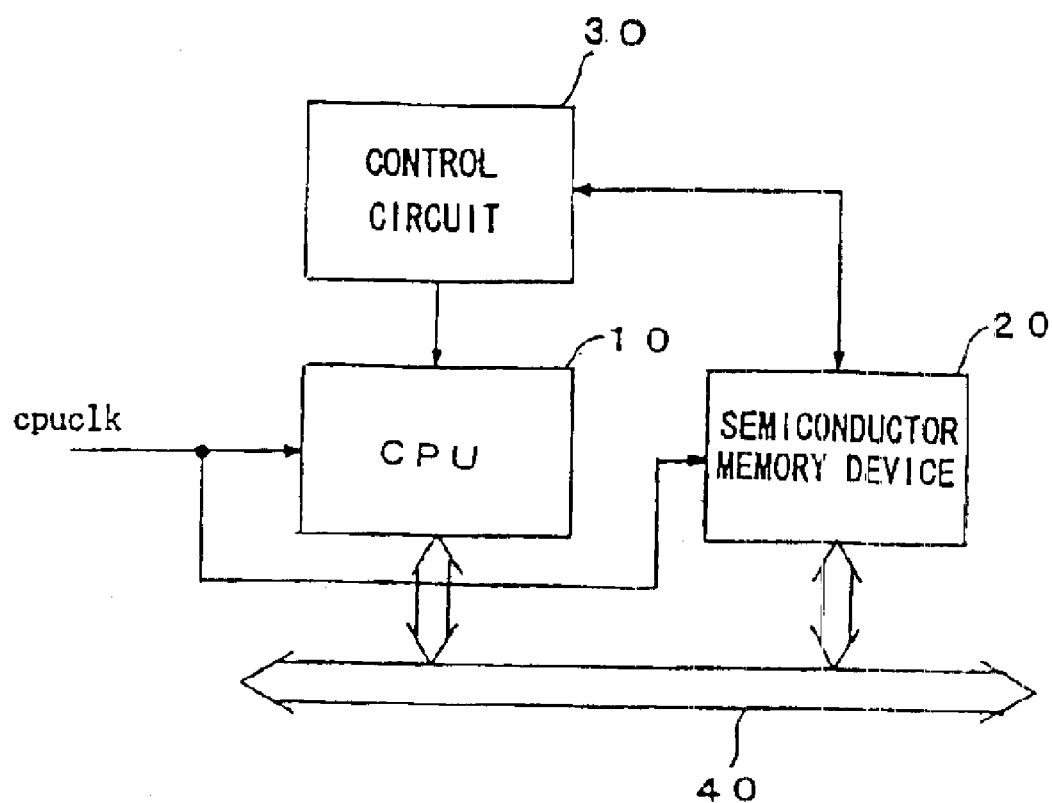
FIG. 1 is a block diagram illustrating an exemplary configuration of a data processor according to the present invention.

FIG. 1 is a block diagram illustrating an exemplary configuration of the data processor according to the present invention.

Figure 2:
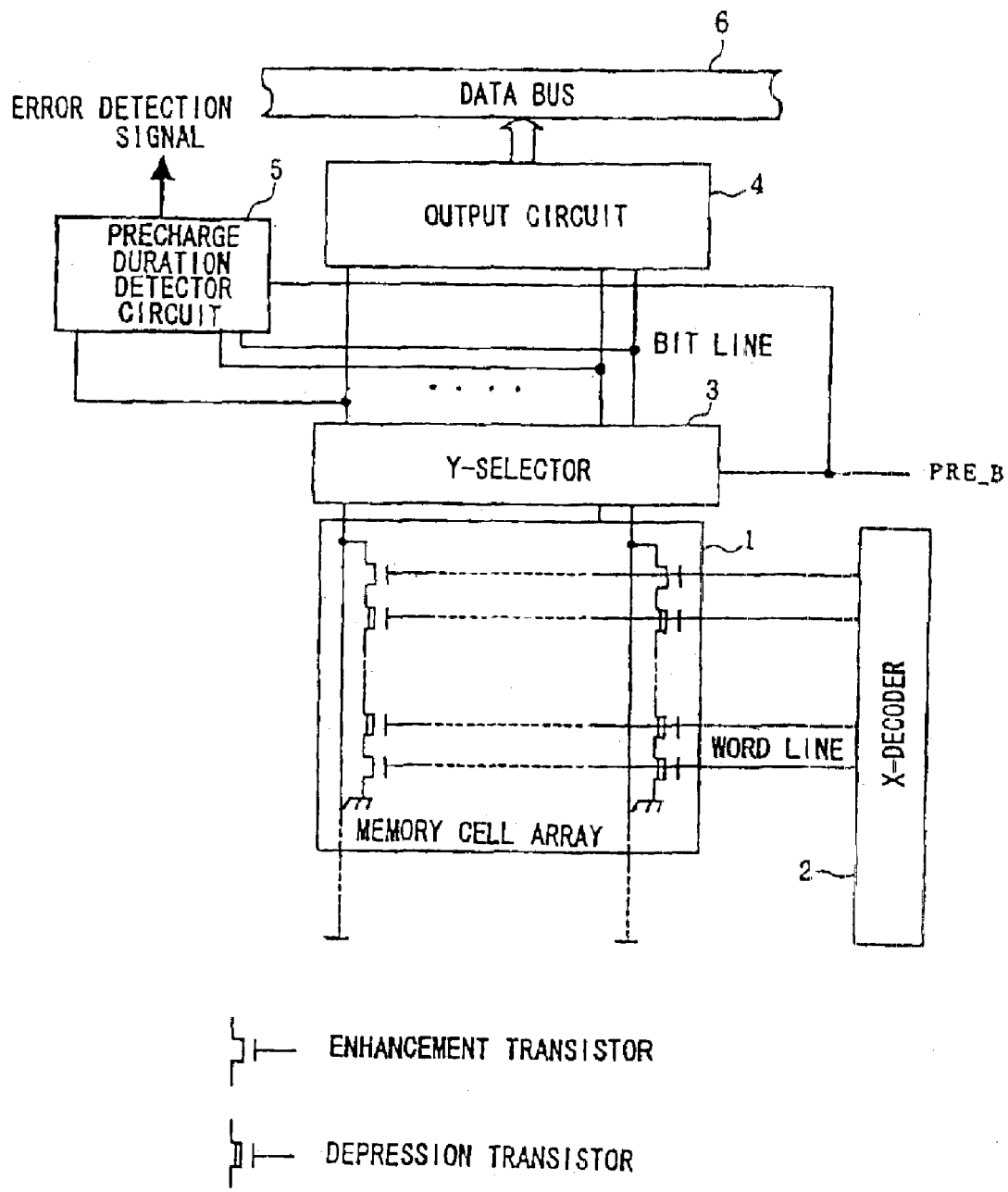
FIG. 2 is a block diagram illustrating the configuration of a semiconductor memory device shown in FIG. 1.
Figure 3:
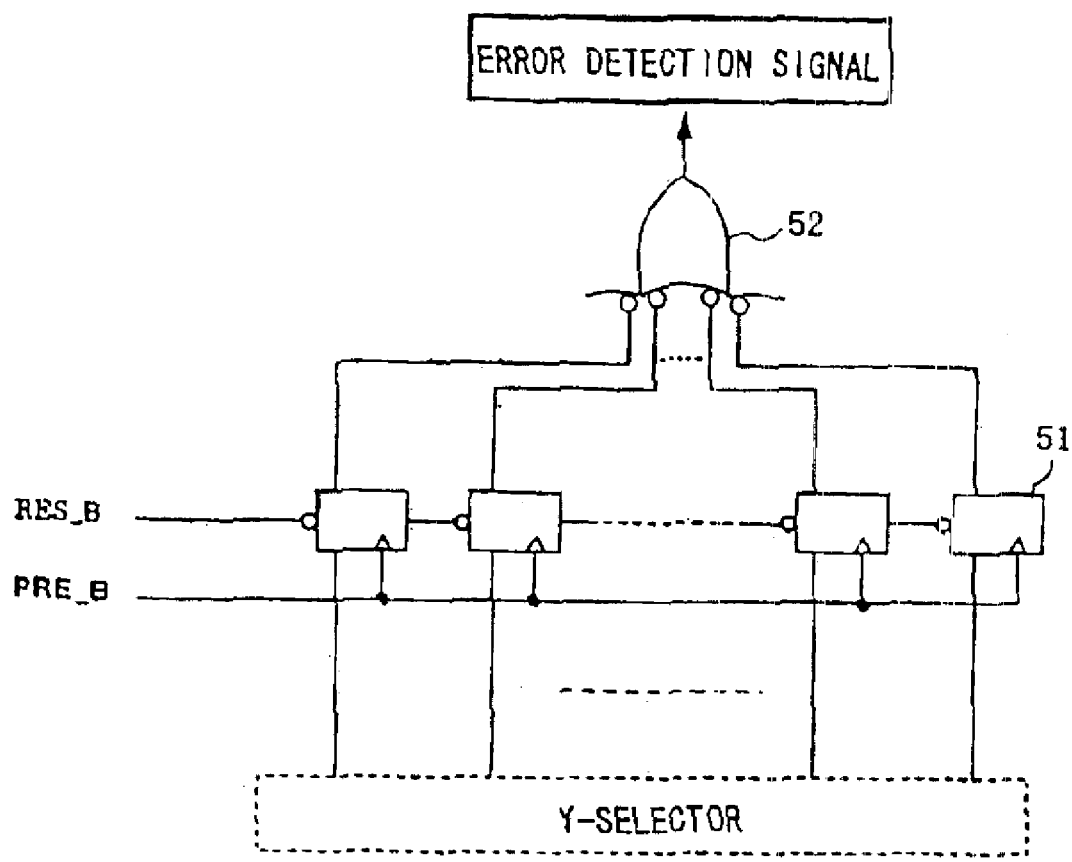
FIG. 3 is a circuit diagram illustrating the configuration of a precharge duration detector circuit contained in the semiconductor memory device.

FIG. 2 in turn is a block diagram illustrating the configuration of a semiconductor memory device shown in FIG. 1, and FIG. 3 is a circuit diagram illustrating the configuration of a precharge duration detector circuit contained in the semiconductor memory device shown in FIG. 2.

As illustrated in FIG. 1, the data processor according to the present invention comprises CPU (Central Processing Unit) 10; semiconductor memory device 20 connected to CPU 10 through bus 40, which requires a precharge for a bit line when data is read therefrom; and control circuit 30 for resetting the operation of CPU 10 in response to an error detection signal delivered from semiconductor memory device 20 when a clock (cpuclk) applied from the outside presents an anomalous frequency.

As illustrated in FIG. 2, semiconductor memory device 20 comprises memory cell array 1 composed of a plurality of memory cells for storing data; X-decoder 2 for decoding a row address for accessing a memory cell into which data is written or from which data is read; and a sense amplifier, not shown, for reading data stored in a memory cell. Semiconductor memory device 20 further comprises a Y-selector 3 for turning on/off the output of the sense amplifier in accordance with the result of decoding a column address for accessing a memory cell into which data is written or from which data is read; output circuit 4 for temporarily holding data read from memory cell array 1; and precharge duration detector circuit 5 for monitoring the potential on a bit line, which is being precharged, to determine whether or not the precharge duration is shorter than a predetermined period.

Output circuit 4 is connected to data bus 6 to communicate data to be written into memory cell array 1 and data read from memory cell array 1 with CPU 10 and the like through data bus 6.

A data write operation for memory cell array 1, and a data read operation from memory cell array 1 are controlled by a mode control circuit, not shown. Also, the precharge operation and discharge operation for a bit line is executed by associated Y-selector 3 in response to precharge signal PRE_B sent from the mode control circuit.

As illustrated in FIG. 3, precharge duration detector circuit 5 comprises a plurality of latch circuit 51; and logic circuit 52 for operating a logical OR of output signals from all latch circuits 51. Each of latch circuits 51 holds an output signal corresponding to the potential on a bit line associated therewith at the end of a precharge, and switches its output signal in accordance with whether or not the potential on the bit line has reached a predetermined potential at the end of the precharge.

Each of latch circuits 51 holds an output signal corresponding to the potential on the associated bit line in synchronization with rising (or falling) precharge signal PRE_B, and resets the output signal when it is supplied with reset signal RES_B at "Low" from control circuit 30. For example, each latch circuit 51 delivers "High" when the potential on the bit line has reached a predetermined precharge potential, and delivers "Low" when the potential on the bit line has not reached the predetermined precharge potential.

Logic circuit 52 is configured to set "High" to an output signal when any of latch circuits 51 delivers "Low." This output signal is used as an error detection signal for resetting the operation of CPU 10. Logic circuit 52 is only required to be a circuit which delivers "High" or "Low" as the error detection signal when any of latch circuits 51 detects that the potential on the bit line does not reach the precharge potential, and a NOR gate, a NAND gate and the like may be used for logic circuit 52 in accordance with the output logic of latch circuits 51.

The data processor according to the present invention comprises semiconductor memory device 20 illustrated in FIG. 2, and control circuit 30 which receives the error detection signal delivered from semiconductor memory device 20, wherein control circuit 30 delivers a reset signal for resetting the operation of CPU 10 upon receipt of the error detection signal from semiconductor memory device 20.

In the configuration as described above, the operation of the data processor according to the present invention will be next described with reference to the drawings.

Figure 4:
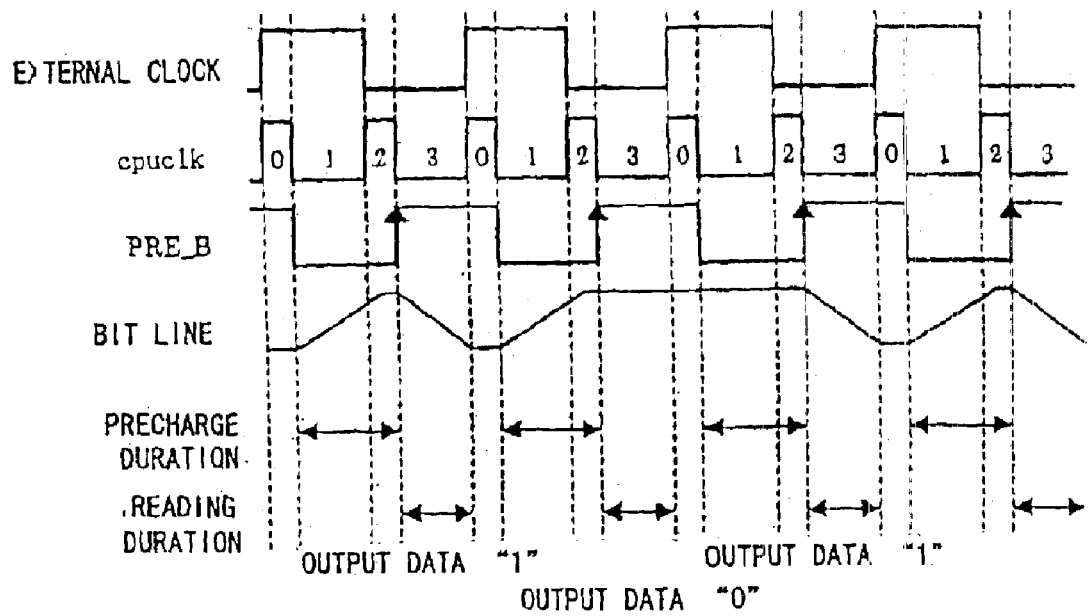
FIG. 4 is a timing chart showing a data read operation of the semiconductor memory device shown in FIG. 2 in a normal operation.
Figure 5:
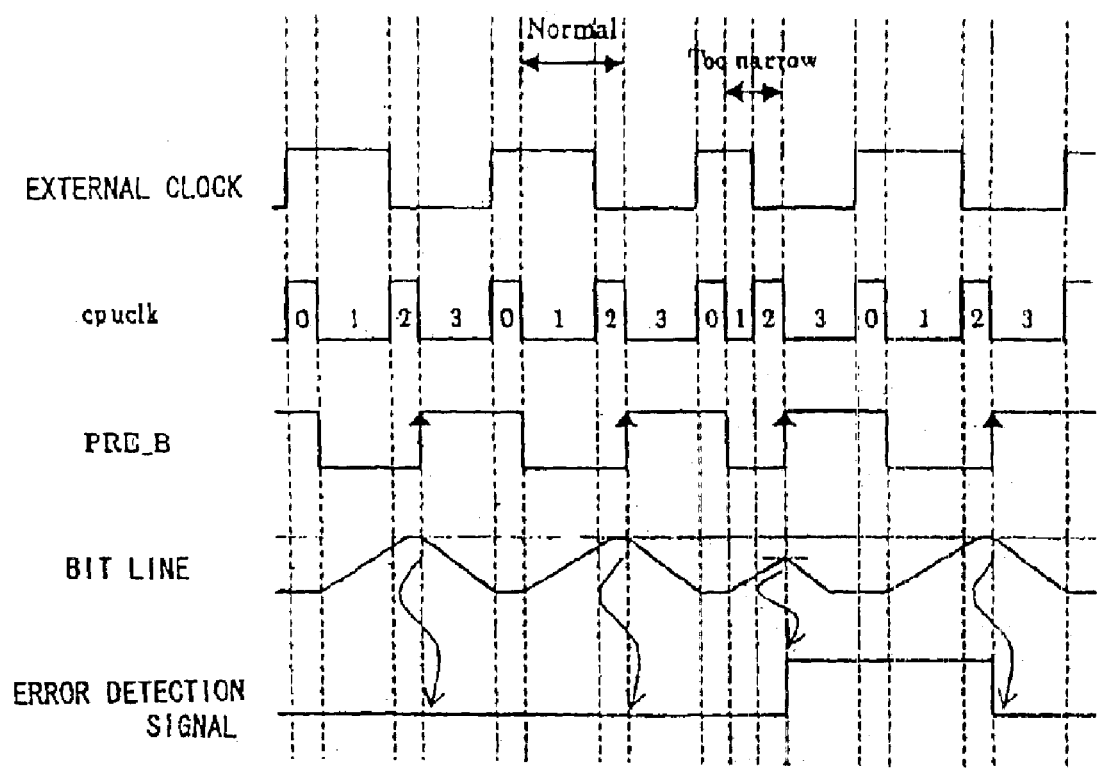
FIG. 5 is a timing chart showing an error detecting operation of the semiconductor memory device shown in FIG. 2 in a data read operation.

FIG. 4 is a timing chart showing a data read operation of the semiconductor memory device illustrated in FIG. 2 in a normal operation, and FIG. 5 is a timing chart showing an error detecting operation of the semiconductor memory device in a data read operation. When the data processor according to the present invention is implemented, for example, in a single semiconductor integrated circuit device, basic clock cpuclk shown in FIGS. 4, 5 is generated within the semiconductor integrated circuit device based on a clock applied from the outside (external clock), and supplied to CPU 10, semiconductor memory device 20, control circuit 30 and the like.

As shown in FIG. 4, when data is read from semiconductor memory device 20, a precharge operation for a bit line is started in synchronization with falling precharge signal PRE_B, and the potential on the bit line reaches a predetermined precharge potential before precharge signal PRE_B next rises.

On the other hand, a discharge operation for a bit line is started in synchronization with rising precharge signal PRE_B, and the potential on the bit line reaches a predetermined potential before precharge signal PRE_B next falls. In this event, when a memory cell transistor connected to a selected word line is in ON state, the bit line transitions to a ground potential, whereas when the memory cell transistor is in OFF state, the bit line is held at the precharge potential.

The sense amplifier monitors the potential on a bit line immediately before the next precharge operation starts (in response to falling precharge signal PRE_B) after the bit line has been discharged to determine the value of data. For example, the sense amplifier determines that output data is "1" when the potential on the bit line is at the ground potential, and that output data is "0" when the potential on the bit line is at the precharge potential.

Each of latch circuits 51 in precharge duration detector circuit 5 delivers a signal corresponding to the potential on an associated bit line at the timing of a precharge duration end (precharge signal PRE_B falls). As shown in FIG. 4, when the externally applied clock (external clock) falls within a predetermined range of frequency, the potential on the bit line has reached the predetermined precharge potential before the end of the precharge duration, causing each latch circuit 51 to deliver "High" and logic circuit 52 to deliver "Low" (indicating that no error has been detected) as the error detection signal.

On the other hand, when the clock frequency applied to semiconductor memory device 20 is higher than the predetermined range (the clock period is shorter) as shown in FIG. 5, a precharge for a bit line is started in response to falling precharge signal PRE_B, as is the case with the foregoing, however, precharge signal PRE_B rises before the bit line reaches the predetermined precharge potential, thereby starting a discharge operation for the bit line.

In this event, latch circuit 51 associated with the bit line holds its output signal at "Low" because the potential on the bit line has not reached the predetermined precharge potential, causing logic circuit 52 to deliver "High" (indicating that an error is detected) as the error detection signal.

The error detection signal is held at "High" until latch circuit 51 next delivers "High," resulting from the potential on the bit line which reaches the predetermined precharge potential.

As appreciated from the foregoing, according to the data processor and clock frequency detecting method of the present invention, an anomalous frequency of the externally applied clock can be detected only by adding latch circuits and a simple logic circuit to an existing semiconductor memory device, thereby making it possible to limit an increase in layout area as compared with a conventional frequency detector circuit composed of capacitor C and resistor R.

Also, in the present invention, the precharge duration of the semiconductor memory device is monitored to detect an anomalous frequency of the externally applied clock, so that the limit of frequency at which data can be read from the semiconductor memory serves as a reference frequency for determining whether or not the frequency of the clock is anomalous. Therefore, the clock frequency at which the data processor can operate and the reference frequency change in similar characteristics even with a varying power supply voltage and ambient temperature, variations related to the manufacturing, and the like, thus eliminating the need for adjusting the characteristics of the precharge duration detector circuit pursuant to the clock frequency at which the data processor can operate. This further eliminates the need for an adjusting step for adjusting the characteristics of the precharge duration detector circuit, resulting in a limited increase in the cost of the data processor.

While preferred embodiments of the present invention have been described using specific terms, such description is for illustrative purposes only, and it is to be understood that changes and variations may be made without departing from the spirit or scope of the following claims.

What is claimed is:

1. A data processor comprising:

a CPU;

a semiconductor memory device having a precharge duration detector circuit for monitoring a potential on a bit line at the end of a precharge to determine whether or not the potential on the bit line has reached a predetermined potential; and a control circuit for resetting the operation of said CPU when the potential on the bit line has not reached a predetermined potential.

2. The data processor according to claim 1, wherein said precharge duration detector circuit comprises:

a plurality of latch circuits each for holding an output signal corresponding to the potential on the bit line associated therewith at the end of the precharge, each said latch circuit switching the output signal based on whether or not the potential on the bit line has reached the predetermined potential at the end of the precharge; and a logic circuit for operating a logical OR of the output signals from said plurality of latch circuits to deliver the result of the operation as an error detection signal.

3. A semiconductor memory device requiring a precharge for a bit line when data is read therefrom, comprising:

a precharge duration detector circuit for monitoring a potential on the bit line at the end of a precharge to determine whether or not the potential on the bit line has reached a predetermined potential; and a control circuit configured to signal a clock signal anomaly when the potential on the bit line has not reached the predetermined potential.

4. The semiconductor memory device according to claim 3, wherein said precharge duration detector circuit comprises:

a plurality of latch circuits each for holding an output signal corresponding to the potential on the bit line associated therewith at the end of the precharge, each said latch circuit switching the output signal based on whether or not the potential on the bit line has reached the predetermined potential at the end of the precharge; and a logic circuit for operating a logical OR of the output signals from said plurality of latch circuits to deliver the result of the operation as an error detection signal.

5. A clock frequency detecting method for use in a data processor which comprises a semiconductor memory device that requires a precharge for each bit line when data is read therefrom, for detecting whether or not an externally applied clock is within a predetermined range of frequency said method comprising the steps of:

monitoring a potential on the bit line at the end of a precharge to determine whether or not the potential on the bit line has reached a predetermined potential; and resetting the operation of a CPU when the potential on the bit line has not reached a predetermined potential.

6. The clock frequency detecting method according to claim 5, further comprising the steps of:

holding output signals corresponding to the potentials on the bit lines at the end of the precharge;

operating a logical OR of the held output signals; and delivering the result of the operation as an error detection signal.

* * * * *